US008795450B2

(12) United States Patent
Usui et al.

(10) Patent No.: US 8,795,450 B2
(45) Date of Patent: Aug. 5, 2014

(54) MANUFACTURING METHOD FOR A STEEL PIPE FOR FUEL INJECTION PIPE

(75) Inventors: Shoichiro Usui, Numazu (JP); Katsunori Nagao, Wakayama (JP)

(73) Assignees: Usui Kokusai Sangyo Kaisha, Shizudoka (JP); Sumitomo Metal Industries, Ltd., Osaka (JP)

(*) Notice: Subject to any disclaimer, the term of this patent is extended or adjusted under 35 U.S.C. 154(b) by 432 days.

(21) Appl. No.: 12/649,075

(22) Filed: Dec. 29, 2009

(65) Prior Publication Data

US 2010/0167086 A1 Jul. 1, 2010

Related U.S. Application Data

(63) Continuation of application No. PCT/JP2008/061856, filed on Jun. 30, 2008.

(30) Foreign Application Priority Data

Jul. 10, 2007 (JP) ................................. 2007-180409

(51) Int. Cl.
*F16L 9/00* (2006.01)
*B21C 37/06* (2006.01)

(52) U.S. Cl.
USPC .......................................... 148/570; 428/677

(58) Field of Classification Search
USPC .......................................... 148/570; 428/677
See application file for complete search history.

(56) References Cited

U.S. PATENT DOCUMENTS

| 5,265,793 A * | 11/1993 | Usui et al. ............. 228/127 |
| 2006/0130945 A1 * | 6/2006 | Arai et al. ............. 148/593 |

FOREIGN PATENT DOCUMENTS

| JP | 63-54765 | 12/1984 |
| JP | 3258207 | 2/1997 |
| JP | 09-57329 | 3/1997 |
| JP | 09-067624 A | 3/1997 |
| JP | 3906942 | 2/1998 |
| JP | 10-88274 | 4/1998 |
| JP | 3410947 | 7/1999 |
| JP | 11-302726 | 11/1999 |
| JP | 2007-40246 | 2/2007 |
| RU | 417 | 5/1995 |
| RU | 2117816 C1 | 8/1998 |
| SU | 478120 A1 | 7/1975 |

OTHER PUBLICATIONS

NPL: English Translation of JP 10088274, Apr. 1998.*
International Search Report in corresponding PCT./JP2008/061856 dated Aug. 5, 2008 as published in English.
Written Opinion in corresponding PCT./JP2008/061856 in Japanese dated Aug. 5, 2008 as translated in English.
International Preliminary Report on Patentability dated Jan. 26, 2010 and issued in English.
International Search Report in corresponding PCT./JP2008/061856 dated Aug. 5, 2008 (Japanese only).
Written Opinion in corresponding PCT./JP2008/061856 in Japanese dated Aug. 5, 2008 (Japanese only).

* cited by examiner

*Primary Examiner* — Jie Yang
(74) *Attorney, Agent, or Firm* — Marshall, Gerstein & Borun LLP

(57) ABSTRACT

There is provided a steel pipe for fuel injection pipe that assures prolonged fatigue life and high reliability by securing a high critical internal pressure, at which fatigue fracture does not occur, while the material strength is high. A steel pipe for fuel injection pipe consisting of, by mass percent, C: 0.12 to 0.27%, Si: 0.05 to 0.40%, and Mn: 0.8 to 2.0%, the balance being Fe and impurities, the impurities containing Ca: 0.001% or less, P: 0.02% or less, and S: 0.01% or less, wherein the tensile strength thereof is not lower than 900 N/mm$^2$, and the maximum diameter of a nonmetallic inclusion present during at least 20 μm depth from the inner surface of the steel pipe is not larger than 20 μm. Further, this steel pipe can contain one or more kinds of Cr: 1% or less, Mo: 1% or less, Ti: 0.04% or less, Nb: 0.04% or less, and V: 0.1% or less.

16 Claims, No Drawings

MANUFACTURING METHOD FOR A STEEL PIPE FOR FUEL INJECTION PIPE

TECHNICAL FIELD

The present invention relates to a steel pipe for fuel injection pipe, and a manufacturing method for the same, which has a tensile strength of not lower than 900 N/mm$^2$ and is used for injecting a fuel into a combustion chamber. More particularly, it relates to a steel pipe for fuel injection pipe, and a manufacturing method for the same, which has an excellent internal pressure fatigue resistance and is used for supplying fuel mist into a combustion chamber of a diesel engine

BACKGROUND ART

In order to deal with future depletion of energy, campaigns for promoting energy saving and for recycling resources as well as development of techniques for accomplishing these purposes are spreading. Especially in recent years, it has been strongly desired, as a global effort, to reduce $CO_2$ emission resulting from fuel combustion in order to prevent global warming.

An example of an internal combustion engine with less $CO_2$ emission is a diesel engine used for motor vehicles and the like. Even with less $CO_2$ emission, however, the diesel engine suffers from a problem of black smoke discharged from the engine. Black smoke is produced when oxygen runs short with respect to the injected fuel. Specifically, a part of fuel thermally decomposed causes a dehydrogenation reaction that produces a precursor of black smoke, and this precursor is thermally decomposed again and agglomerated and joined to produce black smoke. The black smoke produced in this manner causes air pollution, and may have an adverse influence on human bodies.

The amount of the black smoke generated can be reduced by raising the fuel injection pressure of fuel injected into the combustion chamber of diesel engine. For this purpose, however, the steel pipe used for fuel injection is required to have a high fatigue strength. As a manufacturing method for the steel pipe used for fuel injection, the following invention has been disclosed.

Patent Document 1 (JP9-57329A) discloses a manufacturing method for a steel pipe used for fuel injection of a diesel engine, in which the inner surface of hot rolled seamless steel pipe stock is ground by shot blasting, and then cold drawing is performed.

This Document describes that by using this manufacturing method, the depth of a flaw (irregularities, fracture, microcrack, and the like) on the inner surface of steel pipe can be not deeper than 0.10 mm, so that a high strength of the steel pipe used for fuel injection can be attained.

Although it has a high strength, the steel pipe used for fuel injection manufactured by the method disclosed in Patent Document 1 cannot have a fatigue life corresponding to the strength of the steel pipe material. Naturally, as the strength of the steel pipe material increases, the pressure applied to the inside of the steel pipe can be increased; a limiting internal pressure (hereinafter, referred to as a "critical internal pressure"), within which a fracture due to fatigue does not occur on the inner surface of steel pipe when a pressure is applied to the inside of the steel pipe, does not depend only on the strength of steel pipe material. That is to say, even if the strength of steel pipe material is increased, a critical internal pressure cannot be obtained as expected. Considering the reliability or the like of final product, a longer fatigue life is desirable; as the critical internal pressure is reduced, however, the fatigue life is also reduced because the steel pipe is prone to fatigue through the use under high internal pressure.

In particular, the recent tendency aims at higher internal pressure; specifically, the steel pipe is required to have a tensile strength of not lower than 900 N/mm$^2$, and a corresponding improvement in fatigue characteristics is desired.

DISCLOSURE OF THE INVENTION

Problems to be Solved by the Invention

An object of the present invention is to provide a steel pipe for fuel injection pipe, and a manufacturing method for the steel pipe, which assures a prolonged fatigue life and high reliability by securing a high critical internal pressure while the material strength is enhanced. More particularly, an object thereof is to provide a steel pipe for fuel injection pipe, and a manufacturing method for the steel pipe, which has an excellent internal pressure fatigue resistance and a tensile strength not lower than 900N/mm$^2$.

Means for Solving the Problems

To solve the above problems, the present inventors closely investigated the relationship between the tensile strength of steel pipe material and the critical internal pressure of steel pipe. First, by changing the composition of material, a plurality of steel pipes having different tensile strengths were prepared, and the relationship between the tensile strength and the critical internal strength was investigated. Also, for the fatigue-fractured steel pipe obtained at the time of investigation of critical internal pressure, the broken portion thereof was investigated.

The results of the above investigations revealed that in the case of the tensile strength of steel pipe material of lower than 500 N/mm$^2$, and the steel pipes made of materials having almost equal tensile strength, the same breakage form is exhibited even if the critical internal pressure is different. In contrast, a knowledge was obtained that in the case of the tensile strength of steel pipe material of not lower than 500 N/mm$^2$, even the steel pipes made of materials having almost equal tensile strength exhibit different breakage forms depending on the magnitude of critical internal pressure.

That is to say, in the case of the tensile strength of steel pipe material of not lower than 500 N/mm$^2$, the steel pipe having a relatively high critical internal pressure takes the same breakage form as that in the case where the tensile strength is lower than 500 N/mm$^2$. However, for the steel pipe having a relatively low critical internal pressure, fracture originates from an inclusion present near the inner surface of steel pipe; the generation of this inclusion, therefore, can be suppressed to raise the critical internal pressure.

Even in the case of the tensile strength of steel pipe material of not lower than 900 N/mm$^2$, at which the present invention aims, if the steel pipe has a relatively low critical internal pressure, fracture originates from an inclusion present near the inner surface of steel pipe; the generation of this inclusion, therefore, can be suppressed to raise the critical internal pressure.

The present invention was completed based on the above-described knowledge, and the gists thereof are steel pipes for fuel injection pipe described in items (1) and (2) and manufacturing methods for the steel pipe for fuel injection pipe described in items (3) to (6). Hereunder, these items are called respectively "present invention 1" to "present invention 6". Collectively, the items are sometimes called "the present invention".

(1) A steel pipe for fuel injection pipe consisting of, by mass percent, C: 0.12 to 0.27%, Si: 0.05 to 0.40%, and Mn: 0.8 to 2.0%, the balance being Fe and impurities, the impurities containing Ca: 0.001% or less, P: 0.02% or less, and S: 0.01% or less, wherein the tensile strength thereof is not lower than 900 N/mm$^2$, and the maximum diameter of a nonmetallic inclusion present during at least 20 μm depth from the inner surface of the steel pipe is not larger than 20 μm.

(2) The steel pipe for fuel injection pipe according to item (1) above, wherein the steel pipe, in place of part of Fe, contains one or more kinds of Cr: 1% or less, Mo: 1% or less, Ti: 0.04% or less, Nb: 0.04% or less, and V: 0.1% or less.

(3) A manufacturing method for a steel pipe for fuel injection pipe, comprising the steps of quenching the steel pipe having the chemical composition according to item (1) above or (2) above at a temperature of not lower than the $Ac_3$ transformation point, and tempering the quenched steel pipe at a temperature of not higher than the $Ac_1$ transformation point.

(4) The manufacturing method for a steel pipe for fuel injection pipe according to item (3) above, wherein the quenching temperature is not lower than [$Ac_3$ transformation point+30° C.] and not higher than 1150° C.

(5) The manufacturing method for a steel pipe for fuel injection pipe according to item (3) above or (4) above, wherein heating to the quenching temperature is performed at a heating rate of not lower than 10° C./second.

(6) The manufacturing method for a steel pipe for fuel injection pipe according to any one of items (3) above to (5) above, wherein the tempering temperature is not lower than 600° C. and not higher than 650° C.

Advantages of the Invention

The steel pipe in accordance with the present invention, having a tensile strength of not lower than 900 N/mm$^2$, is suitable for being used in an application of, for example, supplying a fuel into the combustion chamber of a diesel engine. The use of this steel pipe can increase the injection pressure of fuel injected into the combustion chamber, so that the emission of black smoke can be reduced while the emission of $CO_2$ is reduced.

BEST MODE FOR CARRYING OUT THE INVENTION

The steel pipe for fuel injection pipe in accordance with the present invention refers to a steel pipe, the inner surface of which is repeatedly subjected to pressures created by fuel injection. In some cases, an extremely high pressure is applied to the inner surface of the steel pipe for a short period of time, or in other cases, a high pressure acts constantly, and this pressure fluctuates. Therefore, the material is fatigued extremely by the impact of pressure. The steel pipe for fuel injection pipe in accordance with the present invention has fatigue characteristics capable of sufficiently withstanding an application under such conditions.

Examples of the steel pipes for fuel injection pipe, used in practice, in accordance with the present invention include a steel pipe that is laid between a fuel pump and a common rail or between the common rail and an injection nozzle in a diesel engine employing an accumulator fuel injection system in order to lead a fuel.

In the diesel engine, in order to suppress the generation of black smoke as described above, fuel injection must be accomplished at an extremely high pressure; the inner surface of the steel pipe for fuel injection pipe, therefore, must withstand this pressure. The steel pipe in accordance with the present invention has been developed as a steel pipe for fuel injection pipe used for a diesel engine subjected to a high internal pressure, and needless to say, can also be used as a steel pipe for fuel injection pipe used for a direct-injection gasoline engine and the like.

For the steel pipe for fuel injection pipe in accordance with the present invention, the tensile strength of the steel pipe material must be not lower than 900 N/mm$^2$. As described above, since a high internal pressure is applied to the steel pipe for fuel injection pipe, the steel pipe is required to withstand this internal pressure; from the viewpoint of light weight however, the steel pipe must have a high tensile strength. The reason why the tensile strength of the steel pipe for fuel injection pipe in accordance with the present invention is defined as not lower than 900 N/mm$^2$ is that this value represents a tensile strength capable of reliably withstanding the pressure applied to the inside of the steel pipe by a pressurized fuel, that is, if this tensile strength is achieved, a steel pipe for fuel injection pipe having excellent fatigue characteristics can reliably be provided.

As the above-described breakage form is described in detail in the paragraphs of examples explained later with reference to specific examples, the magnitude of critical internal pressure depends on the breakage form when the tensile strength is almost equivalent, even if the tensile strength is not lower than 900 N/mm$^2$. In the case where the breakage form originates from an inclusion, the critical internal pressure does not increase as compared to the tensile strength. In the present invention, by the use of a steel pipe stock having the alloy composition of steel regulated to a specific range and the size of the above-described nonmetallic inclusion restrained to a specific range, even if the tensile strength is not lower than 900 N/mm$^2$, a steel pipe for fuel injection pipe having a higher critical internal pressure than that of the prior art is provided.

Hereunder, the steel pipe for fuel injection pipe and the manufacturing method for the steel pipe in accordance with the present invention are explained in detail from the viewpoints of (1) nonmetallic inclusion, (2) chemical composition of steel, and (3) pipe making and heat treatment.

(1) Nonmetallic Inclusion

For the steel pipe for fuel injection pipe in accordance with the present invention, it is necessary that the maximum diameter of a nonmetallic inclusion present near the inner surface of the steel pipe (during at least 20 μm depth from the inner surface of the steel pipe) be not larger than 20 μm. The nonmetallic inclusion refers to an inclusion defined by 3131 in "Glossary of Terms Used in Iron and Steel" of JIS G0202. The precipitation of nonmetallic inclusion is determined by the chemical composition and manufacturing method of steel pipe, and the presence of the precipitation can be confirmed by cutting the steel pipe, polishing the cross section thereof, and then observing the polished surface with an optical microscope in accordance with the microscopic test method for nonmetallic inclusion of steel specified in JIS G0555.

For the steel pipe for fuel injection pipe in accordance with the present invention, the diameter of a large nonmetallic inclusion among numerous precipitated nonmetallic inclusions, that is, the maximum diameter must be not larger than 20 μm. This is because, if the maximum diameter of nonmetallic inclusion exceeds 20 μm, the form of fatigue fracture changes, and the nonmetallic inclusion with the maximum diameter exceeding 20 μm becomes the starting point of fatigue fracture, which lowers the fatigue strength, i.e., the critical internal pressure.

The nonmetallic inclusion is not always present in a spherical shape. Therefore, the maximum diameter of nonmetallic inclusion is defined as (L+S)/2 where L is the length corresponding to the larger diameter of inclusion, and S is the length corresponding to the smaller diameter thereof. Also, the maximum diameter of nonmetallic inclusion only needs to be not larger than 20 μm during at least 20 μm depth from the inner surface of the steel pipe subjected to a high pressure, while in other portions, the nonmetallic inclusion with the maximum diameter exceeding 20 μm will not become the start point of fatigue fracture.

The maximum diameter of A-type inclusions can be reduced by means of reducing the S content in the steel pipe to 0.01% or less by mass. The maximum diameter of B-type inclusions can reduced by means of increasing the cross sectional area of a cast piece at the time of casting. This is because during the time from casting to solidification, larger inclusions float up. The cross sectional area of cast piece at the time of casting is desirably 200,000 mm$^2$ or larger.

The maximum diameter of C-type inclusions can be reduced by means of reducing the Ca content in the steel pipe. For this purpose, the Ca content in the steel pipe for fuel injection pipe in accordance with the present invention is 0.001% or less by mass. Since Ca has a function of agglomerating C-type inclusions, the restriction of Ca content can prevent C-type inclusions from becoming large, and the adverse influence of C-type inclusions can be averted.

Regardless of whether the type of inclusion is A, B or C, a reduced casting rate (for example, a casting rate of about 0.5/min can be used in continuous casting,) can lead to reduced nonmetallic inclusions in steel by means of floating up lightweight nonmetallic inclusions as slag.

(2) Chemical Composition of Steel

The steel pipe for fuel injection pipe in accordance with the present invention contains C, Si and Mn. Hereunder, the action of these elements contained in the steel pipe for fuel injection pipe in accordance with the present invention and the reason for restricting the content thereof are explained. In the description below, the percentage of the content means mass percent.

C: 0.12 to 0.27%

C (carbon) improves the strength of steel pipe material. In order to improve the strength, the C content must be 0.12% or more. However, if the C content exceeds 0.27%, the workability is deteriorated, and it is difficult to form the steel pipe material into a steel pipe. The C content is more preferably 0.12 to 0.2%.

Si: 0.05 to 0.40%

Si (silicon) is contained to deoxidize the steel pipe material. In order to assure the effect of deoxidization, the Si content must be 0.05% or more. However, if the Si content exceeds 0.40%, the toughness may be decreased.

Mn: 0.8 to 2.0%

Mn (manganese) is contained to improve the strength of steel pipe material. In order to improve the strength, the Mn content must be 0.8% or more. However, if the Mn content exceeds 2.0%, segregation is promoted, and the toughness may be decreased.

One of the steel pipes in accordance with the present invention includes Fe and impurities as the balance in addition to the above-described elements. However the content of Ca in impurities must be 0.001% or less as described above, and the contents of P and S must be regulated as described below.

P: 0.02% or less, S: 0.01% or less

Both of P (phosphorus) and S (sulfur) are impurity elements that have an adverse influence on the hot workability and toughness; the contents of P and S, therefore, are preferably as low as possible. If the P content and S content exceed 0.02% and 0.01%, respectively, the hot workability and toughness are significantly decreased.

The steel pipe for fuel injection pipe in accordance with the present invention may contain one kind or more kinds of elements described below in addition to the above-described elements.

Cr: 1% or less

Cr (chromium), though not an essential component, is preferably contained because it has effects of improving the hardenability and wear resistance. In order to achieve these effects, the Cr content is preferably 0.3% or more. However, if the Cr content exceeds 1%, a large amount of bainite is produced, thereby decreasing the toughness.

Mn: 1% or less

Mo (molybdenum), though also not an essential component, is preferably contained because it has effects of improving the hardenability and toughness. In order to achieve these effects, the Mo content is desirably 0.03% or more. However, if the Mo content exceeds 1%, a large amount of bainite is produced, thereby decreasing the toughness.

Ti: 0.04% or less

Ti (titanium), though not an essential component, is preferably contained because it has effects of improving the strength and toughness. In order to achieve these effects, the Ti content is desirably 0.005% or more. However, if the Ti content exceeds 0.04%, inclusions of nitrogen compounds are formed in the steel pipe, and the toughness is decreased. Therefore, the Ti content is more preferably 0.01 to 0.04%.

Nb: 0.04% or less

Nb (niobium), though also not an essential component, is preferably contained because it has effects of improving the strength and toughness. In order to achieve these effects, the Nb content is desirably 0.005% or more. However, if the Nb content exceeds 0.04%, inclusions of nitrogen compounds are formed in the steel pipe, and the toughness is decreased. Therefore, the Nb content is more preferably 0.01 to 0.04%.

V: 0.1% or less

V (vanadium), though also not an essential component, is preferably contained because it has an effect of improving the strength. In order to achieve this effect, the V content is desirably 0.01% or more. However, if the V content exceeds 0.1%, the toughness is decreased.

(3) Pipe Making and Heat Treatment

The steel pipe for fuel injection pipe in accordance with the present invention can be achieved with desired characteristics by pipe making and heat treatment performed by the method described below.

For example, piercing rolling and elongation rolling are perforated by the Mannesmann-mandrel mill pipe making process, and a pipe is finished into a predetermined hot finish dimensions by the stretch reducer sizing. Then, cold drawing is repeated several times, whereby predetermined cold finish dimensions are obtained. In cold drawing, the pipe can easily be cold drawn by stress relief annealing performed beforehand. As the pipe making method for the steel pipe used in the present invention, from the viewpoint of productivity, the Mannesmann-mandrel pipe making process is preferably used, although other pipe making methods such as the plug mill pipe making process can also be used.

After the final cold drawing has been performed, heat treatment of quenching and tempering is performed, whereby a tensile strength of not lower than 900 N/mm$^2$ can be assured.

The quenching condition is that the pipe is heated to a temperature of not lower than the Ac$_3$ transformation point, and is rapidly cooled. The heating temperature is preferably [Ac$_3$ transformation point+30° C.] to 1150° C.; in particular, in the case where the aim is to provide a high-strength pipe, a heating temperature of not lower than 1000° C. is preferable. The higher heating temperature results in the higher strength. If the heating temperature is lower than $Ac_3$, the desired tensile strength cannot be obtained. To the contrary, if it exceeds 1150° C., the dimensional accuracy is reduced, which results in an adverse influence on the toughness and deteriorates the workability. For the steel pipe for fuel injection pipe, the deterioration in workability is unfavorable because plastic working is needed to form the connecting part in which the pipe is connected to a common rail or an injector.

The heating method at the time of quenching is not limited to any specific one. However, in a non-protective atmosphere, heating at a high temperature for a long period of time increases scale produced on the surface of steel pipe, which leads to a decrease in dimensional accuracy and surface properties; in the case of furnace heating such as heating in a walking beam furnace, therefore, short holding time of about 10 to 20 minutes is preferably provided. From the viewpoint of scale restraint, as the heating atmosphere, an atmosphere in which the oxidation potential is low and a non-oxidizing reducing atmosphere are preferable.

Desirably, if the high frequency induction heating method or the direct current-carrying heating method is used as the heating system, heating of short-time holding can be realized. By making the heating rate about 10° C./sec or higher, even in the heating in the atmospheric air, scale produced on the surface of steel pipe can be restrained to a minimum.

In the cooling at the time of quenching, in order to stably and reliably obtain a desired tensile strength not lower than 900 MPa, the steel pipe must be cooled down to below 500° C., at a cooling rate of 10° C./sec or higher between 800° C. and 500° C. Rapid cooling treatment such as water quenching is preferable.

The steel pipe rapidly cooled to normal temperature must be tempered at a temperature not higher than the $Ac_1$ transformation point because it is hard and brittle in the rapidly cooled state. If the tempering temperature is lower than 450° C., the tempering is insufficient, resulting in poor toughness and workability. If the tempering temperature exceeds the $Ac_1$ transformation point, transformation is started, so that it is difficult to obtain desired characteristics stably and reliably. The preferable tempering temperature is 600 to 650° C. Although the holding time at the tempering temperature is not limited to any specific one, the holding time is usually about 10 to 120 minutes. After being tempered, the steel pipe may be straightened appropriately using a straightener or the like.

EXAMPLE 1

To confirm the effects of the present invention, 11 specimen steels having the chemical composition given in Table 1 were prepared. The specimen steels were continuous-cast at the casting rate and with the cast piece cross-sectional area at the casting time as given in Table 2, and subjected to Mannesmann piercing rolling, mandrel mill elongation rolling, and stretch reducer sizing, whereby stocks each having an outside diameter of 34 mm and a wall thickness of 4.5 mm were produced by hot working. To draw each of these hot finished stocks, first, the leading edge of stock was swaged, and a lubricant was applied. Thereafter, cold drawing was performed using a die and a plug to reduce the stock diameter gradually. After the inner surface of stock was machined and ground, diameter reducing treatment was performed as a finishing process, whereby the stock was finished into a steel pipe having an outside diameter of 8.0 mm and a wall thickness of 2.0 mm. As the final process, these steel pipes were quenched and tempered under the heat treatment conditions described in Table 2 to obtain 13 kinds of specimen materials. In Table 2, concerning the heating when quenching, the heating rate is 12.5° C./sec in the case of high frequency heating, and concerning the cooling when quenching, the cooling rate is 12.5° C./sec in the case of high frequency heating and 2.5° C./sec in the case of in-furnace heating, respectively. Specimen material Nos. 3, 6 and 9 were annealed, not being quenched and tempered, as the heat treatment after drawing, and specimen material Nos. 6 and 9 were obtained from the billet identical to that of Nos. 5 and 8, respectively.

TABLE 1

| Specimen steel | Chemical composition (mass %, the balance: Fe and impurities) | | | | | | | | | | |
|---|---|---|---|---|---|---|---|---|---|---|---|
| | C | Si | Mn | P | S | Cr | Mo | Ti | Nb | V | Ca |
| A | 0.17 | 0.31 | 1.38 | 0.014 | 0.005 | — | — | — | — | — | *0.0027 |
| B | 0.17 | 0.31 | 1.38 | 0.014 | 0.005 | — | — | — | — | — | 0.0003 |
| C | 0.17 | 0.31 | 1.38 | 0.014 | 0.005 | 0.06 | 0.01 | 0.020 | — | 0.07 | 0.0003 |
| D | 0.18 | 0.30 | 1.40 | 0.013 | 0.006 | 0.08 | 0.02 | 0.007 | — | 0.08 | *0.0032 |
| E | 0.18 | 0.30 | 1.40 | 0.013 | 0.006 | 0.08 | 0.02 | 0.007 | — | 0.08 | 0.0008 |
| F | 0.19 | 0.32 | 1.36 | 0.016 | 0.006 | 0.05 | 0.19 | 0.018 | 0.033 | 0.06 | *0.0027 |
| G | 0.19 | 0.32 | 1.36 | 0.016 | 0.006 | 0.05 | 0.19 | 0.018 | 0.033 | 0.06 | 0.0001 |
| H | 0.11 | 0.19 | *0.61 | 0.009 | 0.002 | 0.02 | — | — | — | — | 0.0003 |
| I | 0.11 | 0.23 | *0.64 | 0.015 | 0.005 | 0.01 | — | — | — | — | *0.0035 |
| J | 0.19 | 0.25 | 1.31 | 0.011 | *0.013 | 0.04 | 0.19 | 0.020 | 0.030 | 0.06 | 0.0002 |
| K | 0.19 | 0.29 | 1.33 | 0.011 | 0.006 | 0.05 | 0.18 | 0.019 | 0.036 | 0.06 | 0.0012 |

*out of scope of the invention

TABLE 2

| Specimen Material | Specimen Steel | | Casting Rate (m/min) | Cast Piece Cross-Sectional Area (mm²) | Heat Treatment Conditions | Maximum Diameter Of Inclusions (μm) | | | Tensile Strength (N/mm²) | Critical internal pressure (MPa) | State of Fractured Portion |
|---|---|---|---|---|---|---|---|---|---|---|---|
| | | | | | | A-type | B-type | C-type | | | |
| 1 | A | Comparative | 2.3 | 28,000 | Held at 1000° C. × 10 min, quenched, and tempered at | 2 | *20 | *32 | 950 | 220 | Fatigue fracture from inner surface of pipe originated from C-type inclusions. |

TABLE 2-continued

| Specimen Material | Specimen Steel | Casting | Casting Rate (m/min) | Cast Piece Cross-Sectional Area (mm²) | Heat Treatment Conditions | Maximum Diameter Of Inclusions (μm) A-type | B-type | C-type | Tensile Strength (N/mm²) | Critical internal pressure (MPa) | State of Fractured Portion |
|---|---|---|---|---|---|---|---|---|---|---|---|
| 2 | B | Invention | 0.5 | 220,000 | 550° C. × 30 min. | — | 8 | 16 | 945 | 265 | Fatigue fracture from inner surface of pipe. |
| 3 | C | Comparative | 2.3 | 220,000 | Held at 1000° C. × 20 min in annealing furnace, and natural cooled. | — | 9 | 18 | *549 | 200 | Fatigue fracture from inner surface of pipe. |
| 4 | D | Comparative | 0.5 | 28,000 | High frequency heated to 1000° C., quenched | — | *25 | *34 | 915 | 240 | Fatigue fracture from inner surface of pipe originated from C-type inclusions. |
| 5 | E | Invention | 2.3 | 220,000 | without holding time, and tempered at 625° C. × 10 min. | 1 | 7 | 10 | 923 | 260 | Fatigue fracture from inner surface of pipe. |
| 6 | E | Comparative | 2.3 | 220,000 | Held at 1000° C. × 20 min in annealing furnace, and natural cooled | 2 | 5 | 11 | *641 | 235 | Fatigue fracture from inner surface of pipe. |
| 7 | F | Comparative | 0.5 | 28,000 | Held at 1000° C. × 10 min quenched, and tempered at | — | *28 | *33 | 980 | 245 | Fatigue fracture from inner surface of pipe originated from C-type inclusions. |
| 8 | G | Invention | 2.3 | 220,000 | 550° C. × 30 min. | — | 7 | 8 | 994 | 285 | Fatigue fracture from inner surface of pipe. |
| 9 | G | Comparative | 2.3 | 220,000 | Held at 1000° C. × 20 min in annealing furnace, and natural cooled | — | 7 | 9 | *724 | 255 | Fatigue fracture from inner surface of pipe. |
| 10 | H | Comparative | 2.3 | 220,000 | High frequency heated to 1000° C., quenched without holding time, and tempered at 200° C. × 10 min. | — | — | 11 | *505 | 185 | Fatigue fracture from inner surface of pipe. |
| 11 | I | Comparative | 0.5 | 28,000 | | — | *23 | *37 | *495 | 180 | Fatigue fracture from inner surface of pipe. |
| 12 | J | Comparative | 2.3 | 220,000 | Held at 1000° C. × 10 min quenched, and tempered at 625° C. × 30 min. | *23 | 5 | 6 | 992 | 245 | Fatigue fracture from inner surface of pipe originated from A-type inclusions. |
| 13 | K | Comparative | 0.5 | 28,000 | | 2 | *32 | *22 | 998 | 240 | Fatigue fracture from inner surface of pipe originated from B-type inclusions. |

*out of scope of invention

A part of the specimen material, each of which is described above, was cut to obtain a sample, and the sample was processed to a size of tensile test piece specified as No. 11 test piece in JIS, and a tensile test was conducted. For the sample, a portion corresponding to the range to 20 μm depth from the inner surface of steel pipe was observed with an optical microscope to investigate precipitated inclusions.

Table 2 gives the tensile strengths of specimen materials and the maximum diameters of inclusions. Specimen material Nos. 1, 4, 7 and 11 contain Ca more than specimen material Nos. 2, 3, 5, 6 and 8 to 10. Table 2 reveals that specimen material No. 1 and No. 2, No. 4 and No. 5, and No. 7 and No. 8 respectively have approximately equal tensile strength, but for specimen material Nos. 1, 4 and 7 containing Ca more, the maximum diameter of C-type inclusions is larger than that for specimen material Nos. 2, 5 and 8. Also, for specimen material No. 12, the maximum diameter of A-type inclusions is large, and for specimen material No. 10, the maximum diameter of B-type inclusions is large. For specimen material Nos. 3, 6 and 9 subjected to annealing as the heat treatment conditions, the maximum diameter of inclusions can be restrained, but the tensile strength is low, and far away from the target value of 900 MPa.

Further, on the specimen materials, fatigue test was conducted by applying a pressure to the inside of steel pipe. In the fatigue test, the lowest internal pressure was set at 18 MPa, and the highest internal pressure at which fracture does not occur even when the pressure is applied under a load condition of sinusoidal wave with respect to time and the repeating cycle reaches $10^7$ cycles was defined as the critical internal pressure. For the fractured specimen material, the state of the fractured portion was confirmed with an optical microscope.

Table 2 gives the critical internal pressures and fracture states of the specimen materials. Herein as well, specimen material Nos. 1, 4 and 7 containing Ca more have a lower critical internal pressure than specimen material Nos. 2, 5 and 8. Regarding the fracture state, fatigue fracture originates from the inner surface of steel pipe onto which the pressure is most applied; for specimen material Nos. 1, 4 and 7, unlike specimen material Nos. 2.5 and 8, fatigue fracture originates from C-type inclusions present the range to 20 μm depth from the inner surface of steel pipe. Also, for specimen material No. 12, fatigue fracture originates from A-type inclusions present it the range to 20 μm depth from the inner surface of steel pipe, and for specimen material No. 13, fatigue fracture originates from B-type inclusions present similarly in the range to 20 μm depth from the inner surface of steel pipe.

As is apparent from the above-described test results, for the specimen material having a tensile strength as high as 900 MPa, by keeping the maximum diameter of nonmetallic inclusions small, fatigue fracture originating from an inclusion can be averted, and the critical internal pressure can be increased.

EXAMPLE 2

Using specimen steels C and G in Table 1, they were subjected to hot pipe mal and diameter-reducing treatment by cold drawing based on the sa manufacturing method as that in example 1 to obtain finished steel pipes each having an outside diameter of 8.0 mm and a wall thickness of 2.0 mm. The steel pipes were heat treated under various conditions of quenching and tempering, and the tensile strengths were compared by tensile test. The test results are given n Table 3 below.

pipe can be prevented, so that the critical internal pressure can be increased while a tensile strength of not lower than 900 N/mm² is assured. Therefore, when this steel pipe for fuel injection pipe is used as a steel pipe for supplying a fuel into a combustion chamber of diesel engine, fatigue does not occur even if the injection pressure of the fuel supplied into the combustion chamber is increased sufficiently.

The invention claimed is:

1. A manufacturing method for a steel pipe for fuel injection pipe having a tensile strength of not lower than 900 N/mm², the inner surface of which is repeatedly subjected to pressures created by fuel injection, having an increased critical internal pressure defined as a highest internal pressure at which fracture does not occur even when the pressure is applied under a load condition of sinusoidal wave with respect to time and the repeating cycle reaches $10^7$ cycles in the fatigue test wherein the lowest internal pressure is set at 18 MPa, comprising the steps of:

providing a steel pipe that has a chemical composition comprising, by mass percent, C: 0.12 to 0.27%, Si: 0.05 to 0.40%, and Mn: 0.8 to 2.0%, with the balance being Fe and impurities, in which the impurities contain Ca: 0.001% or less, P: 0.02% or less, and S: 0.01% or less, and wherein the maximum diameter of non-metallic inclusions within 20 μm in depth from the inner surface is not larger than 20 μm,

TABLE 3

| Specimen material | Specimen steel | | Casting rate (m/min) | Cast piece cross-sectional area (mm²) | Heat treatment conditions (Note) | Cooling rate (° C./sec) | Tempering temperature (° C.) | Tensile strength (N/mm²) |
|---|---|---|---|---|---|---|---|---|
| 14 | C | Invention | 0.5 | 220,000 | 1100° C. by high frequency heating | 100 | 625 | 945 |
| 15 | C | Invention | 0.5 | 220,000 | 1000° C. × 10 min | 100 | 550 | 1018 |
| 16 | C | Invention | 0.5 | 220,000 | 920° C. × 10 min | 100 | 625 | 932 |
| 17 | C | Invention | 0.5 | 220,000 | 850° C. × 10 min | 100 | 625 | 921 |
| 18 | C | Comparative | 0.5 | 220,000 | 920° C. × 10 min | 100 | 725 | 725 |
| 19 | C | Comparative | 0.5 | 220,000 | 800° C. × 10 min | 100 | 625 | 690 |
| 20 | C | Comparative | 0.5 | 220,000 | 1000° C. × 20 min | 1 | — | 718 |
| 21 | G | Invention | 0.5 | 220,000 | 1000° C. × 20 min | 100 | 525 | 1010 |
| 22 | G | Invention | 0.5 | 220,000 | 920° C. × 20 min | 100 | 450 | 1210 |
| 23 | G | Invention | 0.5 | 220,000 | 850° C. × 20 min | 100 | 450 | 1185 |

Note:
Only specimen material No. 20 was heat treated such as held at 1000° C. × 20 min and open cooled.
Other specimen material Nos. were heat treated such as held at indicated temperature and time, quenched and tempered.

Specimen material Nos. 14 to 17 and 21 to 23 were quenched and tempered under the manufacturing conditions of the present invention, assuring a tensile strength of not lower than 900 N/mm². Among these specimen materials, No. 14 was heated at a heating rate of 12.5° C./sec by high frequency heating, and the soaking time thereof is substantially 0 second. On the other hand, specimen material Nos. 18 to 20 were heat treated without the use of the manufacturing method in accordance with the present invention, and the tensile strengths thereof were lower than 900 N/mm². Specimen material No. 20 was cooled gradually from the heating temperature. From the above-described test results, it can be seen that if the manufacturing method in accordance with the present invention is used, a tensile strength of not lower than 900 N/mm² can be assured stably.

INDUSTRIAL APPLICABILITY

For the steel pipe for fuel injection pipe in accordance with the present invention, fatigue fracture originating from a non-metallic inclusion present near the internal surface of steel quenching the steel pipe at a temperature of not lower than the $Ac_3$ transformation point, and tempering the quenched steel pipe at a temperature of not higher than the $Ac_1$ transformation point.

2. The manufacturing method for a steel pipe for fuel injection pipe according to claim 1, wherein the quenching temperature is not lower than [$Ac_3$ transformation point+30° C.] and not higher than 1150° C.

3. The manufacturing method for a steel pipe for fuel injection pipe according to claim 2, wherein heating to the quenching temperature is performed at a heating rate of not lower than 10° C./second.

4. The manufacturing method for a steel pipe for fuel injection pipe according to claim 3, wherein the tempering temperature is not lower than 600° C. and not higher than 650° C.

5. The manufacturing method for a steel pipe for fuel injection pipe according to claim 2, wherein the tempering temperature is not lower than 600° C. and not higher than 650° C.

6. The manufacturing method for a steel pipe for fuel injection pipe according to claim 1, wherein heating to the quenching temperature is performed at a heating rate of not lower than 10° C./second.

7. The manufacturing method for a steel pipe for fuel injection pipe according to claim 6, wherein the tempering temperature is not lower than 600° C. and not higher than 650° C.

8. The manufacturing method for a steel pipe for fuel injection pipe according to claim 1, wherein the tempering temperature is not lower than 600° C. and not higher than 650° C.

9. A manufacturing method for a steel pipe for fuel injection pipe having a tensile strength of not lower than 900 N/mm$^2$, the inner surface of which is repeatedly subjected to pressures created by fuel injection, having an increased critical internal pressure defined as a highest internal pressure at which fracture does not occur even when the pressure is applied under a load condition of sinusoidal wave with respect to time and the repeating cycle reaches $10^7$ cycles in the fatigue test wherein the lowest internal pressure is set at 18 MPa, comprising the steps of:

provinding a steel pipe that has a chemical composition comprising, by mass percent, C: 0.12 to 0.27%, Si: 0.05 to 0.40%, and Mn: 0.8 to 2.0%, and one or more kinds of Cr: 1% or less, Mo: 1% or less, Ti: 0.04% or less, Nb: 0.04% or less, and V: 0.1% or less, with the balance being Fe and impurities, in which the impurities contain Ca: 0.001% or less, P: 0.02% or less, and S: 0.01% or less, and wherein the maximum diameter of non-metallic inclusions within 20 μm in depth from the inner surface is not larger than 20 μm, quenching the steel pipe at a temperature of not lower than the $Ac_3$ transformation point, and tempering the quenched steel pipe at a temperature of not higher than the $Ac_1$ transformation point.

10. The manufacturing method for a steel pipe for fuel injection pipe according to claim 9, wherein the quenching temperature is not lower than [$Ac_3$ transformation point+30° C.] and not higher than 1150° C.

11. The manufacturing method for a steel pipe for fuel injection pipe according to claim 10, wherein heating to the quenching temperature is performed at a heating rate of not lower than 10° C./second.

12. The manufacturing method for a steel pipe for fuel injection pipe according to claim 11, wherein the tempering temperature is not lower than 600° C. and not higher than 650° C.

13. The manufacturing method for a steel pipe for fuel injection pipe according to claim 10, wherein the tempering temperature is not lower than 600° C. and not higher than 650° C.

14. The manufacturing method for a steel pipe for fuel injection pipe according to claim 9, wherein heating to the quenching temperature is performed at a heating rate of not lower than 10° C./second.

15. The manufacturing method for a steel pipe for fuel injection pipe according to claim 14, wherein the tempering temperature is not lower than 600° C. and not higher than 650° C.

16. The manufacturing method for a steel pipe for fuel injection pipe according to claim 9, wherein the tempering temperature is not lower than 600° C. and not higher than 650° C.

* * * * *